(12) United States Patent
Isaji et al.

(10) Patent No.: US 7,440,830 B2
(45) Date of Patent: Oct. 21, 2008

(54) DRIVING SUPPORT SYSTEM BASED ON DRIVER VISUAL ACQUISITION CAPACITY

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 787 days.

(21) Appl. No.: 10/950,403

(22) Filed: Sep. 28, 2004

(65) Prior Publication Data

US 2005/0085954 A1   Apr. 21, 2005

(30) Foreign Application Priority Data

Oct. 15, 2003   (JP)   ............... 2003-355347

(51) Int. Cl.
   *G01C 21/00*   (2006.01)
(52) U.S. Cl. ............... 701/45; 340/995.15; 701/221
(58) Field of Classification Search .............. 701/45
   See application file for complete search history.

(56) References Cited

U.S. PATENT DOCUMENTS

| | | | |
|---|---|---|---|
| 5,521,580 A * | 5/1996 | Kaneko et al. ............. 340/439 |
| 5,642,093 A * | 6/1997 | Kinoshita et al. ........... 340/439 |
| 7,194,347 B2 * | 3/2007 | Harumoto et al. ............ 701/45 |
| 7,206,697 B2 * | 4/2007 | Olney et al. ................ 701/301 |
| 2004/0193347 A1 * | 9/2004 | Harumoto et al. ............ 701/45 |
| 2005/0080565 A1 * | 4/2005 | Olney et al. ............... 701/301 |
| 2005/0085954 A1 * | 4/2005 | Isaji et al. ................. 701/1 |
| 2005/0143887 A1 * | 6/2005 | Kinoshita .................... 701/45 |

FOREIGN PATENT DOCUMENTS

| | | |
|---|---|---|
| DE | 10136123 A1 | 2/2003 |
| JP | A-09-128689 | 5/1997 |
| JP | A-H11-139229 | 5/1999 |
| JP | A-2001-331900 | 11/2001 |
| JP | A-2003-081039 | 3/2003 |
| JP | A-2003-231449 | 8/2003 |
| WO | WO/ 02/25291 A2 | 3/2002 |

OTHER PUBLICATIONS

Search Report issued from French Patent Office issued on Jan. 10, 2006 for the corresponding French patent application No. FR 0410815 (a copy thereof).
Japanese Office Action dated Oct. 31, 2006 in the corresponding JP Patent Application No. 2003-355347 (a copy and English translation thereof).

* cited by examiner

*Primary Examiner*—Thomas G. Black
*Assistant Examiner*—Shelley Chen
(74) *Attorney, Agent, or Firm*—Posz Law Group, PLC

(57) ABSTRACT

In a driving support system, a necessary information amount determining section determines the amount of visual information necessary for safe driving. An information acquisition capacity setting section sets an information acquisition capacity of a driver. A comparing section compares the necessary information amount with the information acquisition capacity and determines a difference between the two. If a possibility of collision between an object and a vehicle is determined by a collision possibility determining section, a driving support level setting section sets a level of driving support based on the difference.

22 Claims, 6 Drawing Sheets

DRIVING SUPPORT SYSTEM BASED ON DRIVER VISUAL ACQUISITION CAPACITY

CROSS REFERENCE TO RELATED APPLICATION

This application is based on and incorporates herein by reference Japanese Patent Application No. 2003-355347 filed on Oct. 15, 2003.

FIELD OF THE INVENTION

The present invention relates to a driving support system that provides support for driving a vehicle.

BACKGROUND OF THE INVENTION

A driving condition monitoring and warning system for providing information on objects ahead of a vehicle to a driver is proposed in Japanese patent application document JP-A-11-139229. In this system, an object recognition level of the driver is determined and an alarm is produced if the driver has not recognized an object that may be necessary to be recognized for safe driving of the vehicle. The object recognition level indicates how well the driver has recognized existence of objects that are necessary to be recognized for safe driving of the vehicle mainly in a range of the driver's vision.

Although it is difficult for the driver to recognize all of the objects at once if a number of objects exist in the range of driver's vision, the system assumes that all objects in the range are recognized. As a result, an alarm will not be produced for an object in the range even if the object is not recognized by the driver.

SUMMARY OF THE INVENTION

The present invention therefore has an objective to provide a driving support system that provides adequate driving support for an object recognition level of a driver. A driving support system of the present invention has information amount determining means, information acquisition capacity setting means, driving support means, and driving support level setting means. The information amount determining means determines the amount of visual information on objects that are necessary to be recognized by the driver for same driving of a vehicle. The information acquisition capacity setting means estimates a level of the driver in acquiring visual information and sets the estimated level as a visual information acquisition capacity of the driver. The driving support means provides support to the driver in driving the vehicle. The driving support level setting means adjusts a level of driving support provided by the driving support means based on the visual information amount and the information acquisition capacity.

If the amount of visual information necessary for safe driving of a vehicle, hereinafter referred to as the necessary information amount, is equal to or smaller than the information acquisition capacity, the system determines that driver has acquired the adequate amount of information for safe driving. However, the system may provide improper caution or undesired driving support if the driving support level is set to high. Thus, the system adjusts the driving support level to low to reduce such improper caution or undesired driving support.

If the necessary information amount is larger than the information acquisition capacity, the system determines that the driver has not acquired the adequate amount of information for safe driving. In this case, the system adjusts the driving support level to high to provide caution so that the driver realizes existence of an unrecognized object, or desired driving support.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
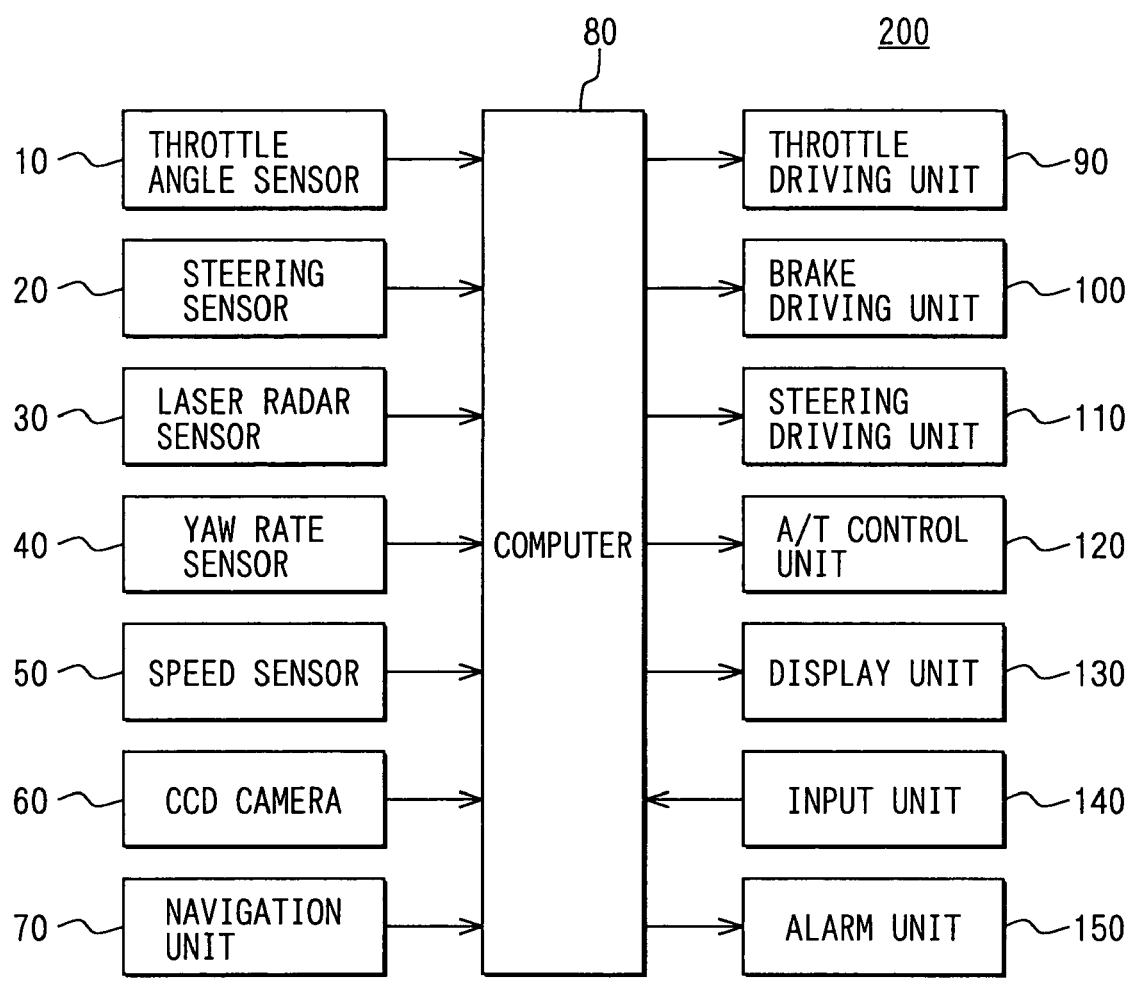
FIG. 1 is a block diagram of a driving support system according to the first embodiment of the present invention.

The preferred embodiments of the present invention will be explained with reference to the accompanying drawings. In the drawings, the same numerals are used for the same components and devices.

A driving support system 200 shown in FIG. 1 is installed in a vehicle, such as an automobile, for providing support to a driver in driving the vehicle. The driving support system 200 includes a throttle angle sensor 10, a steering sensor 20, a laser radar sensor 30, a yaw rate sensor 40, a speed sensor 50, a CCD camera 60, a navigation unit 70, and a computer 80. The sensors 10 through 50, the CCD camera 60, and the navigation unit 70 are all connected to the computer 80. The driving support system 200 further includes a throttle driving unit 90, a brake driving unit 100, a steering driving unit 110, an automatic transmission (A/T) control unit 120, a display unit 130, an input unit 140, and an alarm unit 150. The units 90 through 150 are also connected to the computer 80.

The computer 80 also includes input and output (I/O) interface and various kinds of driving circuits (not shown). Known hardware is used for the I/O interface and the driving circuits and therefore their detailed configurations will not be discussed. The computer 80 executes a process for providing support by notifying the driver that caution is required based on outputs of the sensors 10 through 50. It also executes a process for providing support to the driver in driving a vehicle by operating the throttle driving unit 90, the brake driving unit 100, the steering driving unit 110, and the A/T control unit 120.

The throttle angle sensor 10 detects an opening angle of a throttle valve. A signal from the throttle angle sensor 10, indicating a detected opening angle of the throttle valve, is transmitted to the computer 80. The steering sensor 20 detects a variation in steering angle of a steering wheel and calculates a relative steering angle based on the detected variation in steering angle.

The laser radar sensor 30 outputs laser beams in a predetermined range around the vehicle and detects a distance and a relative speed to an object through the laser beam reflected off the object. The results of the detection are converted into electronic signals and outputted to the computer 80. Different types of sensors, such as a microwave sensor and an ultrasonic wave sensor, can be used for detecting objects around the vehicle.

The yaw rate sensor 40 detects an angular velocity of the vehicle around a vertical axis of the vehicle. The speed sensor 50 detects signals indicating rotation speeds of wheels. The CCD camera 60 is an optical camera used as an image capturing device for capturing images around the vehicle. It converts the captured images into electronic signals and outputs them to the computer 80.

Figure 2:
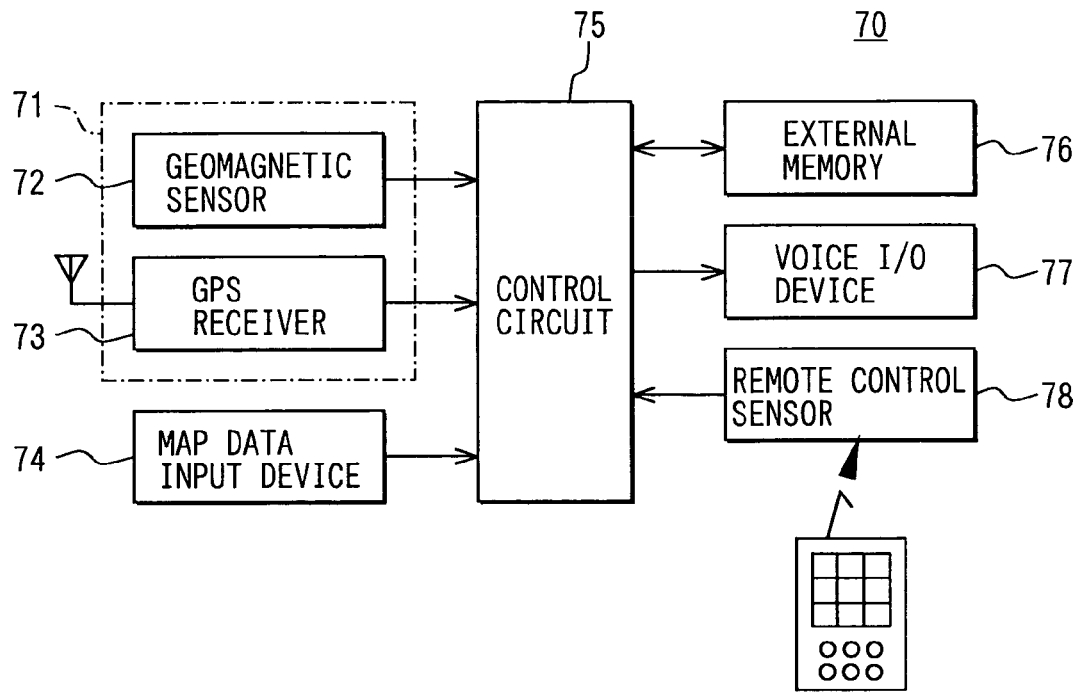
FIG. 2 is a block diagram of a navigation unit included in the driving support system according to the embodiment.

The navigation unit 70 has a map display function for displaying a map around the current position of the vehicle, a point-of-interest search function for searching a desired point of interest, and a route guidance function for providing route guidance to a destination. Referring to FIG. 2, the navigation unit 70 includes a position detector 71, a map data input device 74, an external memory 76, a voice input and output (I/O) device 77, a remote control sensor 78, and a control circuit 75. The position detector 71, the map data input device 74, the voice I/O device 77, and the remote control sensor 78 are connected to the control circuit 75.

The control circuit 75 is a regular computer having a CPU, ROM, RAM, I/O, and buss lines for connecting the units. The ROM stores programs and the CUP or other units perform predetermined calculation processes. The control circuit 75 reads data stored in the external memory 76 or write data into the external memory 76. The position detector 71 includes a known geomagnetic sensor 72 and a known global positioning system (GPS) receiver 73 for detecting the current position of the vehicle. The GPS receiver 73 is used for detecting the current position of the vehicle based on radio waves from a satellite.

Map data including road data, background data, and landmark data can be manually inputted through the map data input device 74. The map data input device 74 sends the data upon a request from the control circuit 75. The manually inputted data is stored in a mass-storage device, such as a CD, a DVD, and an HDD. The voice I/O device 77 includes an input device and an output device (not shown). Various kinds of data are inputted to the navigation unit 70 in the form of speech through the input device. The content of the speech is recognized and used as data. Audio guidance is provided through the output device includes speakers and an audio amplifier.

The navigation unit 70 also outputs information on the current position and road conditions around the current position upon request from the computer 80. The information on road conditions includes, for instance, information on intersections and road categories. The external memory 76 stores the number of objects detected by the laser radar sensor 30 and the CCD camera 60 in relation to the current position on the map.

The throttle driving unit 90, the brake driving unit 100, the steering driving unit 110, and the A/T control unit 120 are driven according to instructions from the computer 80. The throttle driving unit 90 adjusts opening angles of the throttle valve for controlling outputs of an internal combustion engine. The brake driving unit 100 adjusts brake pressures. The steering driving unit 110 drives the steering by producing torque in the steering. The A/T control unit 120 selects appropriate gear positions in an automatic transmission unit for controlling the vehicle speed.

The display unit 130 is a liquid crystal display (LCD) and arranged around a center console in a room of the vehicle. The display unit 130 receives image data for map display outputted from the navigation unit 70 and image data for warning display outputted from the computer 80. The warning display is provided for raising caution to the drive. The display unit 130 then displays images corresponding to the image data. The input unit 140 is a touch switch or a mechanical switch integrated in the display unit 130 and used for inputs of characters or other information. The alarm unit 150 produces an audible alarm for providing caution to the driver based on instructions from the computer 80.

The computer 80 executes a recognition support process for producing an alarm by operating the alarm unit 150 to notify the driver of existence of objects around the vehicle. The computer 80 also executes a driving operation support process for providing support to the driver in driving vehicle by operating the brake driving unit 100, the steering driving unit 110, and the A/T control unit 120. With the support, the driver is more likely to avoid collision with the objects.

The computer 80 extracts pieces of visual information necessary for safe driving from visual information that the driver can visually obtain during driving and determines the amount of the extracted information. The visual information necessary for safe driving is referred to as necessary information. The computer 80 also estimates a level of the driver in acquiring visual information during driving and sets the estimated level as an information acquisition capacity of the driver.

The computer 80 continuously compares the necessary information amount with the information acquisition capacity. The computer 80 changes a manner of alarms in the recognition support or a level of the driving support based on results of the comparison. For example, the computer 80 changes volume of alarms or frequency in the recognition support and the amount of speed reduction or the amount of torque producing in the steering in the driving support.

Figure 3:
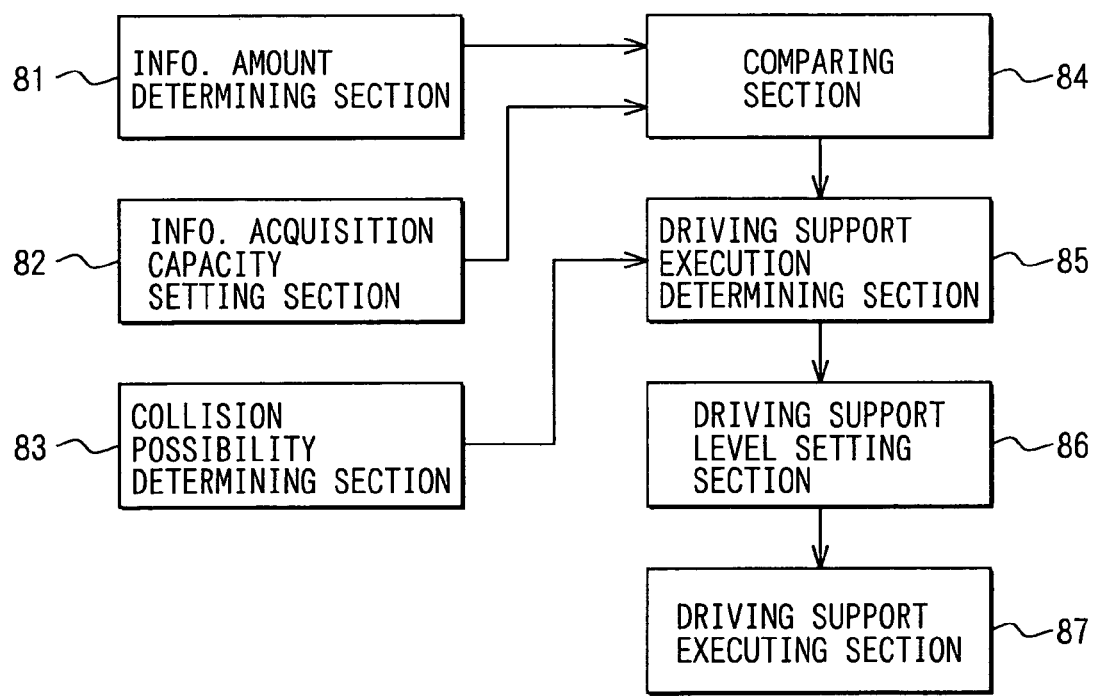
FIG. 3 is a control block diagram of a computer included in the driving support system according of the embodiment.

Referring to FIG. 3, the computer 80 includes an information amount determining section 81, an information acquisition capacity setting section 82, a collision possibility determining section 83, a comparing section 84, a driving support execution determining section 85, a driving support level setting section 86, and a driving support executing section 87. The amount determining section 81 extracts pieces of necessary information from the information obtained by the laser radar sensor 30 or the CCD camera 60 and stored in the external memory 76. The necessary information includes objects obtainable by the driver during driving and necessary to be recognized by the driver for safe driving. The objects are, for example, obstacles to driving, such as other vehicles or pedestrians, and road facilities, such as traffic lights, road signs, and lane dividing objects including lane dividing lines. The amount determining section 81 determines the amount of necessary information based on the extracted pieces of necessary information. The amount determining section 81 performs this extraction every unit time, for instance, every several seconds.

Figure 4:
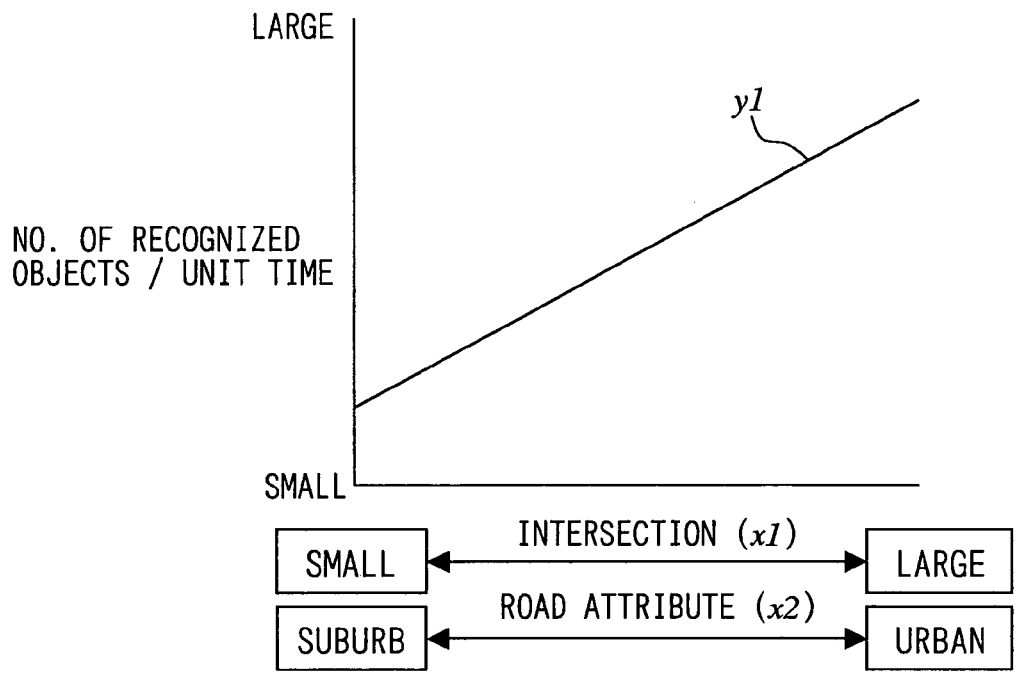
FIG. 4 is a diagram showing a relationship between road conditions and the amount of the necessary information according to the embodiment.

The necessary information amount is usually relative to the road conditions, including intersections and road attributes, shown in FIG. 4. If the vehicle is currently located on a suburban road or approaching a small intersection at which narrow roads having less lanes cross, a large amount of visual information is not required. On the other hand, if the vehicle is currently located on an urban road or approaching a large intersection at which broad roads having more lanes cross, a large amount of visual information is required.

The number of objects related to road facilities, which are necessary to be recognized for safe driving, can be estimated from an attribute of the current road and a size of an upcoming intersection through multiple regression analysis. In the multiple regression analysis, the number of the objects (variable y) is calculated from the current road attribute and the intersection size (variable x). A multiple regression equation (y1) is formulated by investigating the number of objects in different road conditions, that is, roads having different attributes and intersection sizes:

$$y1 = a + b \cdot x1 + c \cdot x2$$

where a through c are regression coefficients. The number of objects is calculated by substituting the intersection size (x1) and the current road attribute (x2), which are obtained through the navigation unit 70, in the equation (y1). Then, the calculated number of objects is determined as the necessary information amount.

The laser radar sensor 30 and the CCD camera 60 detect objects around the vehicle. Obstacles to safe driving, such as other vehicles or pedestrians, are selected from the detected objects and the amount of information on the obstacles is determined. The obstacle information amount is added to the necessary road facility information amount and the overall necessary information amount is determined, namely, the visual information amount required for safe driving is determined. Since the necessary information amount is adequately determined, the information necessary for safe driving is properly extracted from the visual information.

Accident-prone intersections may be investigated to determine the amount of necessary information on each intersection and the necessary information amount is stored in the navigation unit 70 as map data. When the vehicle is approaching one of such intersections, the necessary information amount for the intersection is promptly determined based on the map data. Moreover, the necessary information amount may vary depending on time, a day of the week, and weather. Thus, the necessary information amount adequate for actual traffic conditions is determined when these factors are taken into consideration.

Figure 5:
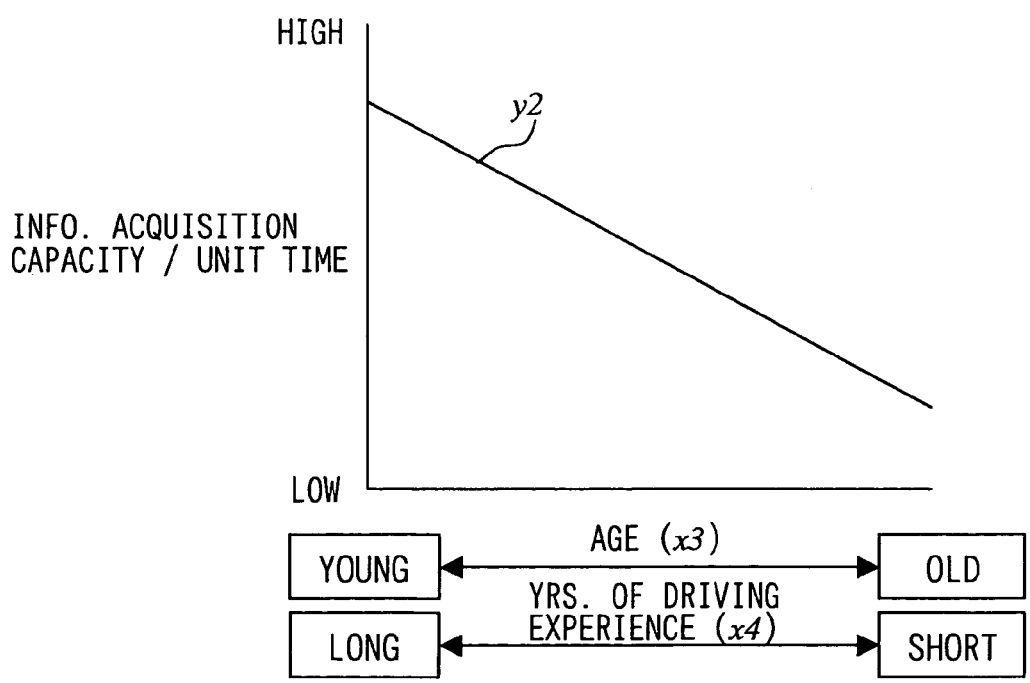
FIG. 5 is a diagram showing a relationship between age and driving history of a driver and the information acquisition capacity according to the embodiment.

The information acquisition capacity setting section 82 estimates a level of the driver in acquiring visual information and sets the estimated level as an information acquisition capacity. The information acquisition capacity varies from person to person. As shown in FIG. 5, the visual information acquisition capacity is high if a person is young and has a long driving experience, and it is low if a person is old and has a short driving experience. Namely, the information acquisition capacity is relative to an age and a driving experience of the driver. Therefore, the information acquisition capacity can be estimated based on the age and the driving experience of the driver through multivariate analysis, such as the multiple regression analysis described above. The information acquisition capacity (variable y) can be calculated from the age and the driving experience of the driver (variable x). A multiple regression equation (y2) is formulated by investigating the information acquisition capacities of people in different ages and having different driving experiences:

$$y2 = d + e \cdot x3 + f \cdot x4$$

where d through f are regression coefficients.

For instance, objects that simulate vehicles and pedestrians are placed in a background that simulates steady scenery around a vehicle. The number of objects that a driver recognizes per unit time, for example, per several seconds, is counted. The multiple regression equation (y2) can be formulated based on this number of recognized objects. The information acquisition capacity is calculated by substituting the age of the driver (x3) and the driving experience (x4) in the equation (x2). The age (x3) and the driving experience (x4) are inputted by the driver prior to the start of driving.

The collision determining section 83 determines whether possibility of collision between obstacles and the vehicle exists. If existence of at least one obstacle that may collide with the vehicle is determined, the collision determining section 83 issues an instruction to the driving support determining section 85 for executing the recognition support or the driving support.

Figure 6:
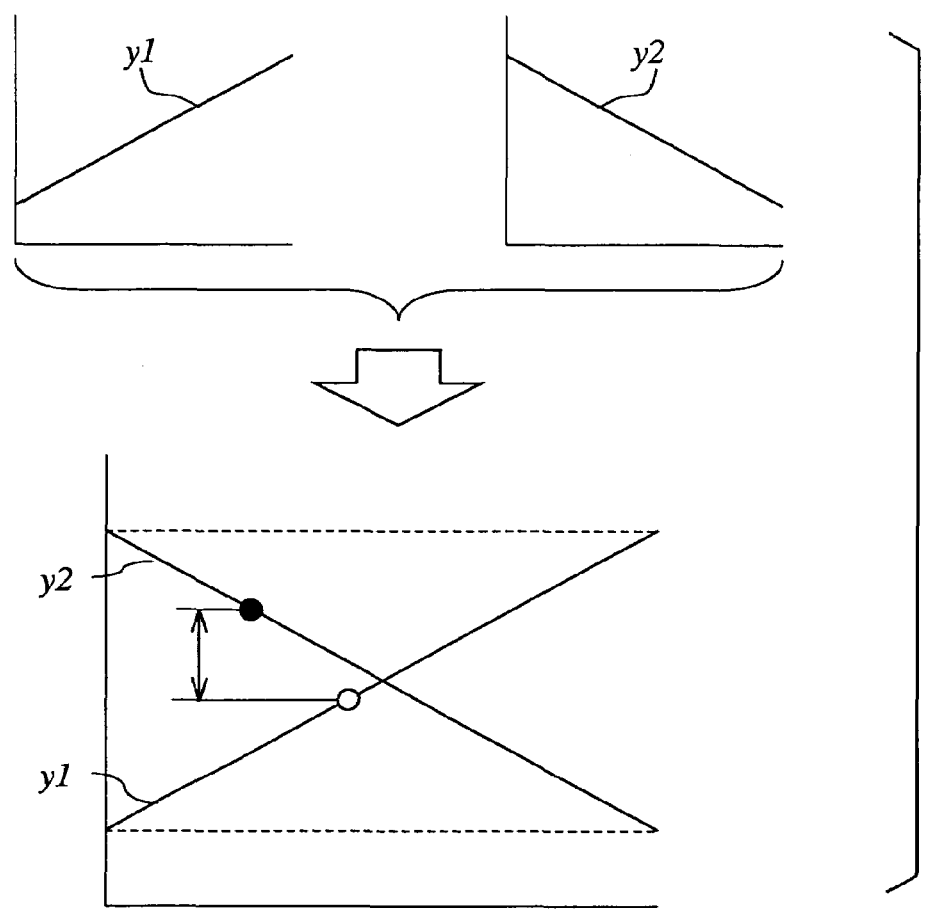
FIG. 6 is a diagram showing a relationship between the necessary information amount and the visual information acquisition capacity according to the embodiment.

The comparing section 84 compares the necessary information amount inputted from the amount determining section 81 with the information acquisition capacity inputted from the capacity setting section 82. It also calculates a difference between the necessary information amount and the information acquisition capacity. The relationship between the necessary information amount and the information acquisition capacity is shown in FIG. 6. The necessary information amount (y1) at the current position is compared with the information acquisition capacity (y2) of the driver to determine whether it is within the information acquisition capacity.

If the necessary information amount y1 is equal to or smaller than the information acquisition capacity y2 (y2−y1=positive value), the comparing section 84 determines that the necessary information amount y1 is within the information acquisition capacity y2. If the necessary information amount y1 is larger than the information acquisition capacity y2(y2−y1=negative value), the comparing section 84 determines that the necessary information amount y1 is over the information acquisition capacity y2.

The execution determining section 85 determines whether an execution of the driving support is required based on whether an instruction for the execution of the driving support is inputted from the collision determining section 83. For example, the execution determining section 85 determines that the execution of the driving support is required when the instruction is inputted. Then, it sends the difference between the amount of the necessary information and the information acquisition capacity to the level setting section 86.

The level setting section 86 sets the driving support level according to the difference between the amount of the necessary information and the information acquisition capacity. The level setting section 86 determines that the driver has the adequate amount of information for safe driving when the necessary information amount is equal to or smaller than the information acquisition capacity.

The executing section 87 executes driving support at the level determined by the level setting section 86. For example, the executing section 87 turns down the volume of alarm or reduces the frequency of the alarm in the recognition support. In the driving support, the amount of the reducing speed is lowered or the amount of torque in the steering is decreased.

Namely, the driving support level is decreased in this case. As a result, improper warning or undesirable driving support is less likely to be provided.

If the necessary information amount is over the information acquisition capacity, the level setting section 86 determines that the driver does not have the adequate amount of information for safe driving. In this case, the volume of the alarm is turned up or the frequency of the alarm is increased in the recognition support. In the driving operation support, the amount of reducing speed is increased or the amount of torque in the steering is increased. Namely, the driving support level is increased in this case. As a result, proper warning or desirable driving operation support is produced.

Figure 7:
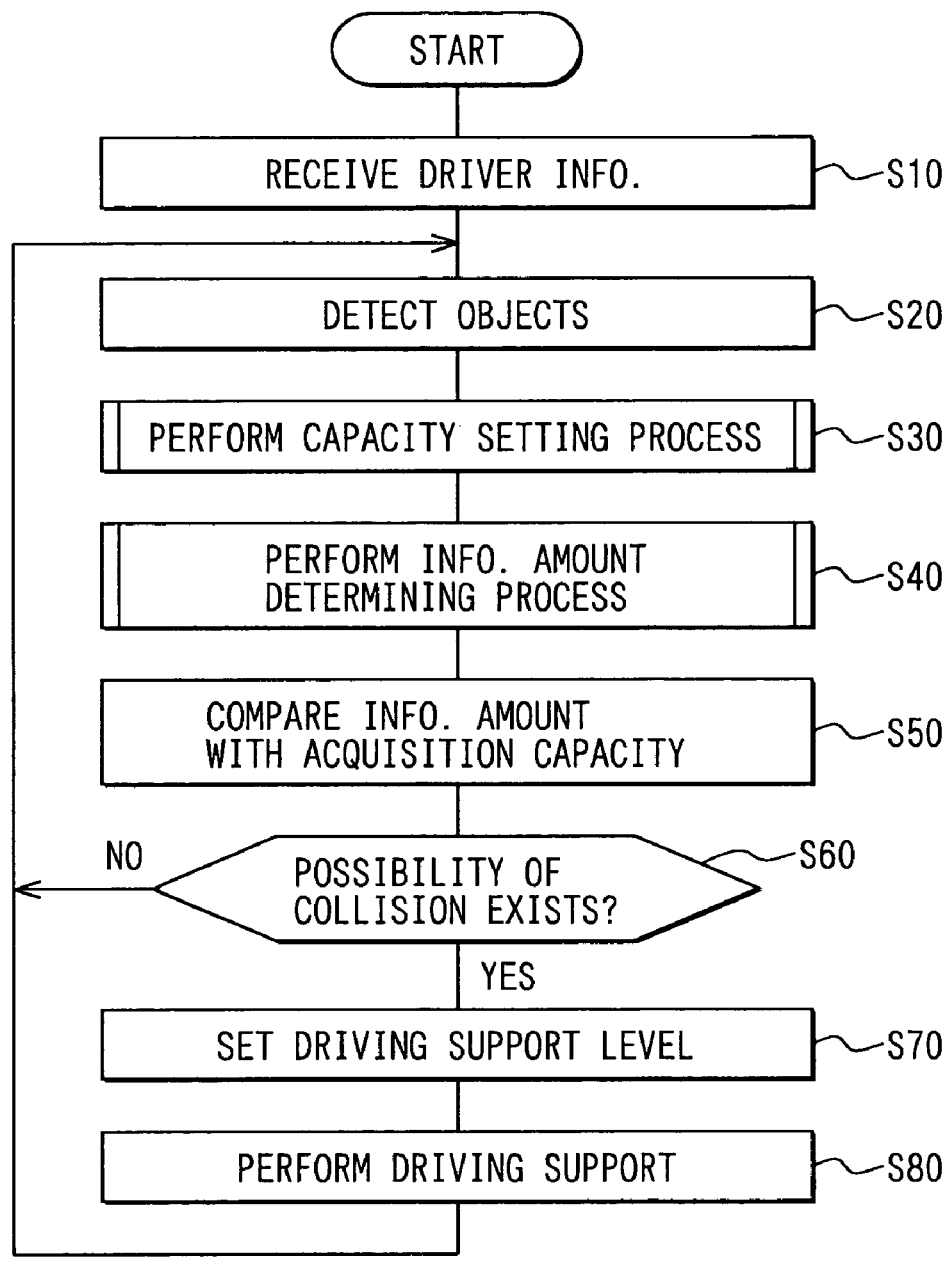
FIG. 7 is a flowchart of a driving support process performed by the computer according to the embodiment.
Figure 8:
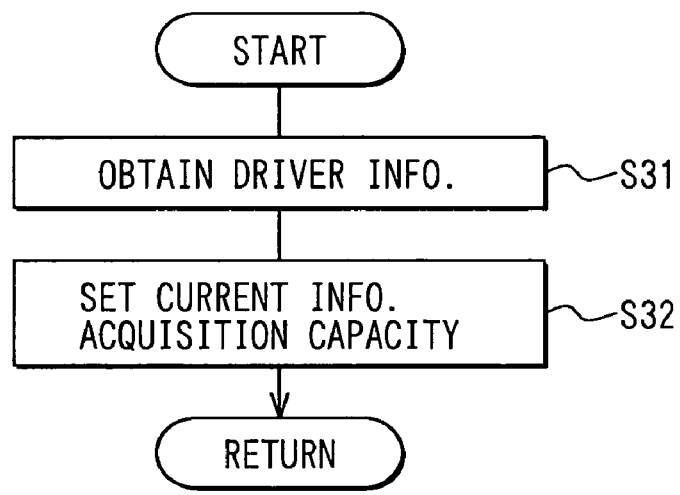
FIG. 8 is a flowchart of a visual information acquisition capacity setting process included in the driving support process according to the embodiment.

A driving support process performed by the driving support system 200 will be explained referring to FIG. 7. Information on the driver including an age and yeas of driving experience is received (S10). Objects around the vehicle are detected (S20). An information acquisition capacity setting process is performed (S30). In this process, the information acquisition capacity is set as shown in FIG. 8. The information on the driver received at step S10 is obtained (S31). A current level of the driver in acquiring visual information is estimated and set as the current information acquisition capacity of the driver based on the obtained information (S32).

Figure 9:
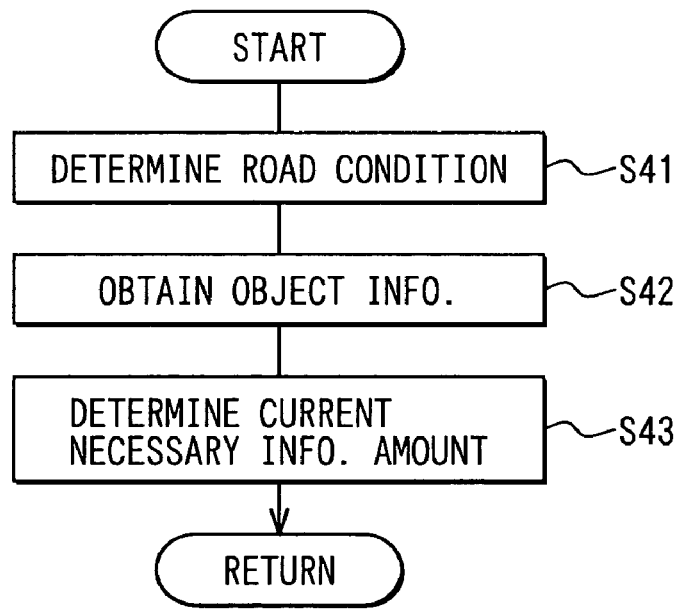
FIG. 9 is a flowchart of a necessary information amount determining process included in the driving support process according to the embodiment.

A necessary information amount determining process is performed (S40). In this process, the necessary information amount is determined as shown in FIG. 9. The conditions of a road that the vehicle is currently located, including intersections and road attributes, are determined (S41). Objects detected at step S20 are obtained, classified for each of different road conditions, and the number of the objects in each road condition is determined (S42). The current amount of the necessary information is determined based on the determined number of objects (S43).

The necessary information amount is compared with the information acquisition capacity and a difference between the two is calculated (S50). It is determined whether possibilities of collision between objects detected at step S20 and the vehicle exist (S60). If the possibilities exist, the driving support level is set based on the difference between the necessary information amount and the information acquisition capacity (S70). The driving support is performed at the set driving support level (S80). If the possibilities do not exist, steps S20 through S60 are repeated.

In the driving support system 200, the support levels are adjusted according to the difference between the necessary information amount and the information acquisition capacity when an object around the vehicle has a predetermined positional relationship with the vehicle. Therefore, a driving support appropriate for an object recognition level of the driver is provided.

The present invention should not be limited to the embodiment previously discussed and shown in the figures, but may be implemented in various ways without departing from the spirit of the invention. For example, information on other vehicles or pedestrians, which is necessary for safe driving, may be obtained via communication with road infrastructures, or with other vehicles or pedestrians. The driving support system 200 can be applied to other types of driving support including support in lane keeping to avoid a departure of the vehicle from a lane without the driver's intention.

The collision determining section 83 may be configured to select the closest obstacle from the objects that are selected as obstacles. Then, it issues an instruction so that the execution determining section 85 determines an execution of driving support to avoid the closest obstacle. With this configuration, a driving support appropriated for the object recognition level of the driver is provided.

The driving support system 200 may further include a vision detecting unit for detecting vision of the driver. With this configuration, objects existing outside the rage of the vision are selected. Then, an instruction for performing a driving support to avoid the objects is issued to the execution determining section 85. Thus, a driving support appropriate for the object recognition level of the driver is provided.

If the necessary information amount is significantly lower than the information acquisition capacity, it can be determined that the driver can adequately recognize surrounding conditions. In this case, the recognition support or the driving support is not performed. If the amount of the necessary information exceeds the information acquisition capacity, a caution may be issued for suggesting the driver to refrain from driving.

What is claimed is:

1. A driving support system comprising:
information amount determining means for determining an amount of visual information of objects, which need to be recognized by a driver for safe driving of a vehicle;
information acquisition capacity setting means for estimating a level of the driver in acquiring visual information and setting the estimated level as a visual information acquisition capacity of the driver;
driving support means for providing support to the driver in driving the vehicle;
driving support level setting means for setting a level of driving support provided by the driving support means based on the visual information amount and the visual information acquisition capacity;
object detecting means for detecting objects around the vehicle; and
object selecting means for selecting objects necessary to be recognized by the driver for safe driving from the detected objects and determining a number of selected objects, wherein the information amount determining means determines the amount of visual information based on the number of the selected objects.

2. The driving support system according to claim 1, wherein:
the driving support means includes at least one of caution indicating means for providing support in driving of the vehicle by notifying the driver that caution is required and driving operation supporting means for providing support in driving operation of the vehicle; and
the driving support level setting means sets a support level of at least one of the caution indicating means and the driving operation support means.

3. The driving support system according to claim 2, wherein the driving support level setting means adjusts the support level of both the caution indicating means and the driving operation support means.

4. The driving support system according to claim 1, wherein:
the information amount determining means determines the amount of the information obtained per a predetermined time; and
the information acquisition capacity setting means sets an information acquisition capacity that the driver can visually obtain in a predetermined period of time.

5. The driving support system according to claim 1, further comprising obstacle selecting means for selecting an object that becomes an obstacle to safe driving from the selected objects and determining the selected object as an obstacle, wherein the driving support means provides support in driving of the vehicle to avoid the obstacle.

6. The driving support system according to claim 1, further comprising:

position detecting means for detecting a current position of the vehicle;

object classifying means for classifying objects for each of different road conditions and determining a number of the objects in each road condition; and storing means for storing the number of objects in relation to a current position on a map, wherein at least one of the object classifying means and the object selecting means determines the number of objects in consideration of at least one of time of a day, a day of a week, and weather, and the information amount determining means determines the amount of visual information based on the number of objects determined with such consideration.

7. A driving support system comprising:

information amount determining means for determining an amount of visual information of objects, which need to be recognized by a driver for safe driving of a vehicle;

information acquisition capacity setting means for estimating a level of the driver in acquiring visual information and setting the estimated level as a visual information acquisition capacity of the driver;

driving support means for providing support to the driver in driving the vehicle;

driving support level setting means for setting a level of driving support provided by the driving support means based on the visual information amount and the visual information acquisition capacity;

position detecting means for detecting a current position of the vehicle; and object classifying means for determining a number of objects, the objects necessary to be recognized by the driver for safe driving, for each of different road conditions, wherein the information amount determining means determines the amount of visual information based on the determined number of the objects.

8. The driving support system according to claim 7, wherein the object classifying means determines the number of the objects in consideration of at least one of time of a day, a day of a week, and weather.

9. A driving support system comprising:

information amount determining means for determining an amount of visual information of objects, which need to be recognized by a driver for safe driving of a vehicle;

information acquisition capacity setting means for estimating a level of the driver in acquiring visual information and setting the estimated level as a visual information acquisition capacity of the driver;

driving support means for providing support to the driver in driving the vehicle;

driving support level setting means for setting a level of driving support provided by the driving support means based on the visual information amount and the visual information acquisition capacity;

position detecting means for detecting a current position of the vehicle; and storing means for storing a number of objects, the objects necessary to be recognized by the driver for same driving, in relation to a current position on a map, wherein the information amount determining means obtains the number of the objects related to the current position of the vehicle from the storing means and determines the amount of visual information based on the obtained number of the objects.

10. The driving support system according to claim 9, wherein the storing means stores the number of the objects in consideration of at least one of time of a day, a day of a week, and weather.

11. The driving support system according to claim 1, wherein the objects include an obstacle to driving and a road facility.

12. The driving support system according to claim 1, further comprising driver information inputting means for inputting individual information on the driver, wherein the information acquisition capacity setting means sets the information acquisition capacity based on the individual information on the driver.

13. The driving support system according to claim 7, wherein:

the driving support means includes at least one of caution indicating means for providing support in driving of the vehicle by notifying the driver that caution is required and driving operation supporting means for providing support in driving operation of the vehicle; and the driving support level setting means sets a support level of at least one of the caution indicating means and the driving operation support means.

14. The driving support system according to claim 7, wherein:

the driving support means includes at least one of caution indicating means for providing support in driving of the vehicle by notifying the driver that caution is required and driving operation supporting means for providing support in driving operation of the vehicle;

the driving support level setting means sets a support level of at least one of the caution indicating means and the driving operation support means; and the driving support level setting means adjusts the support level of both the caution indicating means and the driving operation support means.

15. The driving support system according to claim 7, wherein:

the information amount determining means determines the amount of the information obtained per a predetermined time; and the information acquisition capacity setting means sets an information acquisition capacity that the driver can visually obtain in a predetermined period of time.

16. The driving support system according to claim 7, wherein the objects include an obstacle to driving and a road facility.

17. The driving support system according to claim 7, further comprising driver information inputting means for inputting individual information on the driver, wherein the information acquisition capacity setting means sets the information acquisition capacity based on the individual information on the driver.

18. The driving support system according to claim 9, wherein:

the driving support means includes at least one of caution indicating means for providing support in driving of the vehicle by notifying the driver that caution is required and driving operation supporting means for providing support in driving operation of the vehicle; and the driving support level setting means sets a support level of at least one of the caution indicating means and the driving operation support means.

19. The driving support system according to claim 9, wherein:
the driving support means includes at least one of caution indicating means for providing support in driving of the vehicle by notifying the driver that caution is required and driving operation supporting means for providing support in driving operation of the vehicle;
the driving support level setting means sets a support level of at least one of the caution indicating means and the driving operation support means; and
the driving support level setting means adjusts the support level of both the caution indicating means and the driving operation support means.

20. The driving support system according to claim 9, wherein:
the information amount determining means determines the amount of the information obtained per a predetermined time; and
the information acquisition capacity setting means sets an information acquisition capacity that the driver can visually obtain in a predetermined period of time.

21. The driving support system according to claim 9, wherein the objects include an obstacle to driving and a road facility.

22. The driving support system according to claim 9, further comprising driver information inputting means for inputting individual information on the driver, wherein
the information acquisition capacity setting means sets the information acquisition capacity based on the individual information on the driver.

* * * * *